United States Patent [19]

Drexel et al.

[11] Patent Number: 5,002,175
[45] Date of Patent: Mar. 26, 1991

[54] CONTROL DEVICE FOR LIFTING AND LOCATING PALLETS

[75] Inventors: Peter Drexel, Steinenbronn; Helmut Hauser; Gernot Maier, both of Stuttgart; Peter Rothfuss, Ditzingen, all of Fed. Rep. of Germany

[73] Assignee: Robert Bosch GmbH, Stuttgart, Fed. Rep. of Germany

[21] Appl. No.: 276,044

[22] PCT Filed: Feb. 27, 1988

[86] PCT No.: PCT/DE88/00102

§ 371 Date: Nov. 11, 1988

§ 102(e) Date: Nov. 11, 1988

[87] PCT Pub. No.: WO88/06946

PCT Pub. Date: Sep. 22, 1988

[30] Foreign Application Priority Data

Mar. 20, 1987 [DE] Fed. Rep. of Germany ... 8704208[U]

[51] Int. Cl.⁵ ............................................. B65G 15/64
[52] U.S. Cl. ................................ 198/345.3; 198/346.1
[58] Field of Search .................... 198/345, 346, 463.3, 198/345.3, 346.1; 29/33 P, 464, 559, 564, 784

[56] References Cited

U.S. PATENT DOCUMENTS

| | | | |
|---|---|---|---|
| 3,646,656 | 3/1972 | Zilahy et al. | 198/345.3 X |
| 4,095,687 | 6/1978 | Shaiket | 198/345.3 |
| 4,217,978 | 8/1980 | Stalker | 198/345.3 |
| 4,706,796 | 11/1987 | Chambers | 198/346.1 |
| 4,736,830 | 4/1988 | Hofmann | 198/345.3 |
| 4,757,890 | 7/1988 | Motoda | 198/345.3 |

FOREIGN PATENT DOCUMENTS 3244924 6/1984 Fed. Rep. of Germany .
52-49811 4/1977 Japan .

Primary Examiner—H. Grant Skaggs
Assistant Examiner—Cheryl L. Gastineau
Attorney, Agent, or Firm—Michsrl J. Striker

[57] ABSTRACT

A device for lifting and positioning platelike workpiece carriers comprising stops for stopping a workpiece carrier and movable into the conveying path of the workpiece carrier, and two rails located on opposite sides of the conveying path of the workpiece carrier and each having a locking bar surface cooperating with a stop surface on the workpiece carrier in a stopped position of the workpiece carrier to lift and fix the workpiece carrier in a predetermined position thereof, at least one of the rails being movable transverse relative to the conveying path of the workpiece carrier.

4 Claims, 3 Drawing Sheets

CONTROL DEVICE FOR LIFTING AND LOCATING PALLETS

BACKGROUND OF THE INVENTION

The invention relates to a lifting and positioning device for platelike workpiece carriers. Such a device is known from the DE-PS 32 44 924. The transporting device for workpiece pallets shown in the latter comprises a conveying means which rotates in a guide duct and carries the pallets which are guided in the guide duct. A stopping and positioning device is assigned to every processing station and comprises a stop, which is movable in the conveying path for stopping a pallet, as well as locking bars which cooperate with wedge-shaped or conical stop surfaces of the pallets, lift the respective pallet from the conveying means and fix it in a predetermined position. The known lifting and positioning device is arranged below the guideway of the conveying path and to the side of the guide duct. The stop surfaces assigned to the pallet are formed at two cylindrical pegs which face downward. Platelike projections with wedge-shaped locking surfaces serve as locking bars. Two locking bar plates, which are movable into the duct, are provided on one side of the guide duct, one stationary locking bar plate being located opposite each movable locking bar plate beyond the duct. Both the movable locking bar plates and the stationary locking bar plates cooperate with the defined stop surfaces of the cylindrical pegs.

SUMMARY OF THE INVENTION

In the lifting and positioning device according to the invention, two stop surfaces are formed on opposite lateral defining surfaces of the workpiece carrier plates. Two rails provided with locking bar surfaces are arranged on both sides of the transporting path. At least one rail moves transversely to the transporting direction of the workpiece carrier. The device according to the invention has the advantage that the surfaces of the workpiece carrier plate and the locking bar rails coming into contact with one another are relatively large. Accordingly, it is possible to leave the workpieces, which are to be processed or outfitted, on the workpiece carriers when strong vertical forces occur during the processing or outfitting. This is the case, for example, during pressing or riveting operations. Relatively large forces can be absorbed by the contacting surfaces of the workpiece carriers and locking bar rails without impairing the accuracy of the positioning of the workpiece carriers and, accordingly, of the workpieces located on them. The thickness of the locking bar rails need not be greater than that of the carrier plates, or, if so, only to an inconsiderable degree, so that the work area remains free of interfering superstructural parts and is easily accessible from all sides.

For an exact positioning of the workpiece carrier with a simple construction of the positioning means, it is particularly advantageous that horizontally extending stop surfaces and locking bar surfaces, respectively, which serve to lift the workpiece carrier from the conveying path, be formed at every workpiece carrier and at every rail, and that at least one rail and one stop surface of the workpiece carrier, which stop surface is located opposite the rail, be provided with surfaces for fixing the workpiece carrier in the conveying direction, these surfaces being disposed vertically relative to the conveying direction. In order that the lifting and positioning device is also capable of absorbing very high forces without damage, it is provided that it comprise an arrangement for supporting the workpiece carrier which is lifted from the conveying path and fixed.

DESCRIPTION OF THE DRAWINGS

Additional features and advantages of the present invention would become more apparent from the description of a preferred embodiment which follows with reference to the appended drawings wherein.

DESCRIPTION OF THE PREFERRED EMBODIMENT

Figure 1:
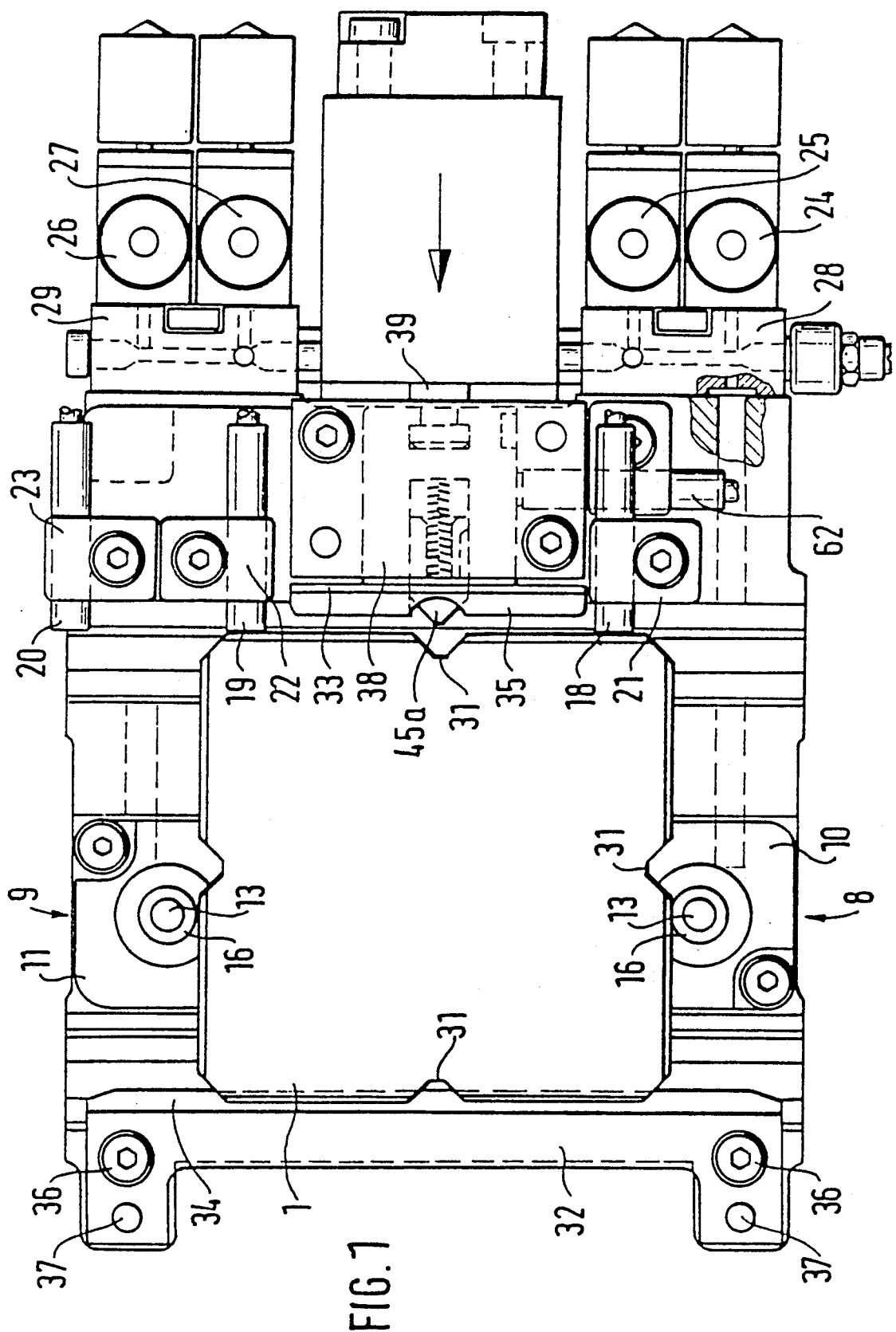
FIG. 1 shows a top view of the lifting and positioning device for workpiece carriers, which is constructed as a constructional unit.

The lifting and positioning device for workpiece carriers 1, which is comprised in a constructional unit, has a housing 2 in which, among others, two parallel recesses having a rectangular cross section are constructed. A carrying section 3 and 4, respectively, for a roller-conveying chain 5 and 6, respectively, which is indicated in dashed lines, fits in each recess. These chains form the conveying path for workpiece carriers 1 which are constructed in a platelike manner. Belts or other known conveying means can also be used instead of roller chains. The housing 2 is mounted on a frame, not shown, by screws 7.

As can be seen from FIG. 1, the platelike workpiece carrier 1 has a rectangular or square outer contour. It lies with its underside on the respective uppermost portion of the roller-conveying chain 5, 6. At least one workpiece, which undergoes processing and/or outfitting in machine stations, not shown, is fastenable on its upper side.

A first separator 8 and a main separator 9 (FIG. 1) are arranged in the housing 2 between the carrying sections 3, 4. The workpiece carriers 1, which are advanced by the roller-conveyor chains 5, 6, can be stopped in predetermined positions by means of the first separator 8 and main separator 9. The main separator 9 has the task of stopping the workpiece carrier 1 when the workpiece located on the latter has reached its processing position. The first separator 8 stops the subsequent workpiece carrier 1 during the processing process. The separators 8, 9, which are integrated in the housing 2, are constructed identically and substantially comprise a cover 10 and 11, respectively, with piston rod guide 12, a piston rod 13 w 14, a pressure spring 15. A damping ring 16 of elastomeric material is placed on the piston rod. The covers 10 and 11, respectively, are screwed to the housing 2 in each instance. Each part 12, 14 is accommodated in a cylinder space 17 which is connected to a compressed-air supply via a line which is shown in dash lines. The line opens into the cylinder space 17 above the piston 14.

The spring 15 biases the piston 14 and piston rod 13 into an upper stop position in which the damping ring 16 lies in the path of movement of the workpiece carrier 1. A plurality of sensors, preferably magnetic-field switches 18, 19, 20, which are fastened by screws to the housing 2 by means of holders 21, 22 and 23, respectively, are arranged along the conveying path for interrogating the respective position of the workpiece carrier entering a processing station.

The interrogation pulses of the switches are supplied as control pulses to magnetic valves which control the individual movement sequences. In the embodiment shown, four 3/2-way valves 24, 25, 26, 27 are provided, which are fastened in pairs in each instance on a valve plate 28 and 29, respectively, attached to the housing 2. In addition to the switches 18, I 9, 20 arranged along the movement path of the workpiece carriers 1, additional magnetic-field switches are provided, whose operation will be explained in more detail below.

Figure 2:
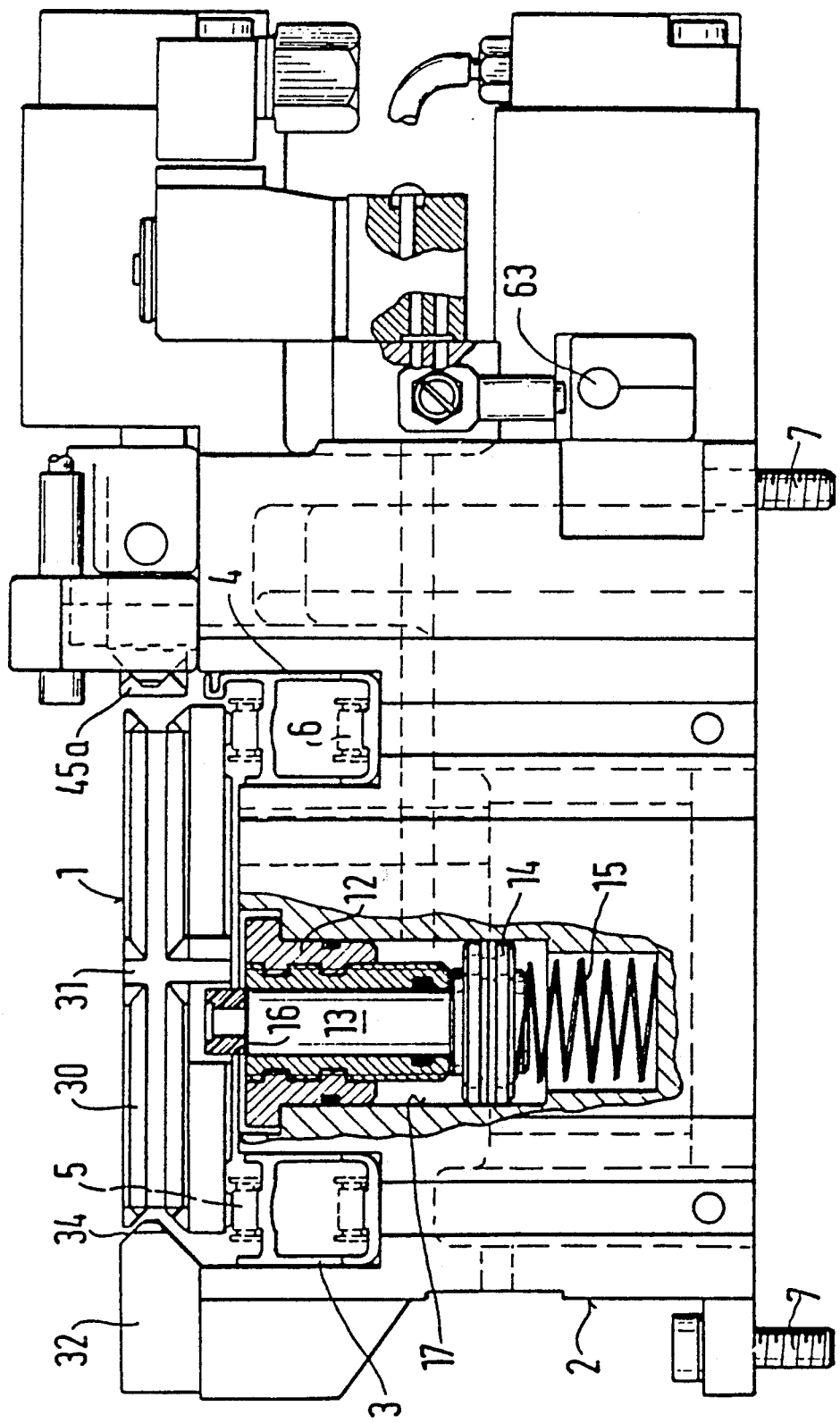
FIG. 2 shows the device in a side view, partially in section, of the device with a workpiece carrier which is stopped, but not yet fixed.

In order to lift a respective workpiece carrier 1 stopped by the main separator 9 from the roller-conveying chains 5, 6 and fix it in the predetermined position, the lateral limiting surfaces of each workpiece carrier are constructed as limit stop surfaces. Locking bar surfaces cooperate with these stop surfaces. The locking bar surfaces are formed on rails arranged on both sides of the transporting path. At least one of the rails is movable transversely relative to the transporting direction of the workpiece carrier. Details of the arrangement can be seen particularly in FIGS. 1 and 2. The stop surfaces are defined surfaces of prismshaped recesses at the circumference of the workpiece carrier 1. Every workpiece carrier is provided with a horizontal prism groove 30 and a vertical prismatic recess 31, which intersects the latter, at its four lateral surfaces.

A rail 32, 33 having a wedge-shaped surface 34, 35 facing the workpiece carrier, is arranged opposite a respective prism groove 30 of the workpiece carrier extending in the conveying direction. The left-hand rail 32 is fastened to the housing 2 by screws 36 and positioning pins 37. The right-hand rail 33 is arranged so as to be movable transversely relative to the transporting direction of the workpiece carrier in a guide part 38 which is screwed to the housing 2. A piston rod 39 acting on the movable rail 33 is connected with a piston 41, which is guided in a cylinder space 40 of the housing 2 and is based by a pressure spring 42 to its right-hand end position. A closing cover 40a for the cylinder space 40, provided with a pneumatic connection 43, serves as an end stop 7.

Figure 3:
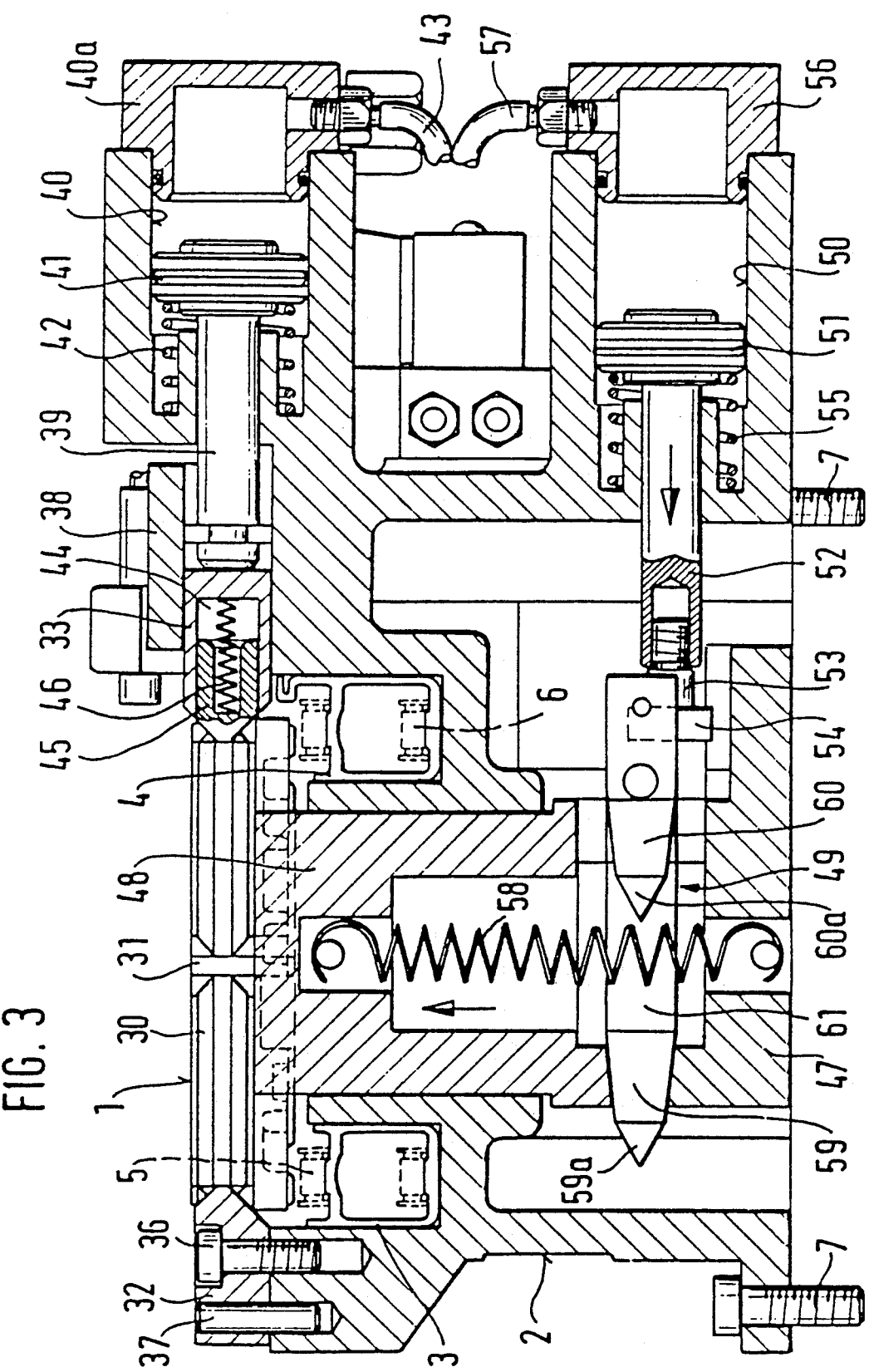
FIG. 3 shows a sectional view of the device with a workpiece carrier which is fixed and lifted from the conveying path.

As can be seen from FIG. 3, a recess 44 for receiving a spring-loaded pin 45 is formed in the prism rail 33 and in its continuation, which is guided so as to be displaceable in the guide part 38, which is fixed with respect to the device. The loading spring 46 is supported with its one end at the base of the recess 44 and with its other end at the end face of a bore hole formed in the pin 45. The free end of the pin 45 is formed as a wedge 45a which penetrates into the prismatic recess 31 of the workpiece carrier 1 located opposite it, and fixes the latter in the forward feed direction during the processing or outfitting process of the workpiece located on the carrier. The two surfaces of the wedge 45a form the locking bar surfaces cooperating with the stop surfaces of the prismatic recess 31.

The wedge surfaces 34, 35 of the two rails 32 and 33, respectively, lie somewhat higher than the bevel surfaces of the prism grooves 30 of the workpiece carrier 1 cooperating with them. When the rail 33 is transferred into the work position, according to FIG. 3, from the rest position shown in FIG. 2, by means of the piston 41, which is acted upon by the compressed air, the workpiece carrier 1 is first fixed by means of the wedge 45a of the pin 45 which penetrates into the prismatic recess 31 of the carrier, and is then pressed against the rail 32 by means of the rail 33. The vertical offsetting of the stop surfaces and locking bar surfaces cooperating with one another causes the workpiece carrier 1 to be lifted from the roller-conveying chains 5, 6, so that the workpiece located on it can be subjected to a processing and outfitting, respectively. Since the stop surfaces between the workpiece carrier and rails are relatively large, relatively high vertical forces can be absorbed without the parts being excessively stressed. Such vertical forces occur particularly during pressing and riveting work.

In order to reliably absorb very great forces, as well, there is provided an additional arrangement for supporting the workpiece carrier 1 which workpiece carrier 1 is lifted from the conveying path and fixed, against operating pressure. In particular, this arrangement has a base 47, which is screwed to the housing, a support element 48 which is movable vertically relative to the conveying direction, and a reciprocating slide 49 which is arranged between the base and supporting element. A pneumatic actuating drive is provided for moving the slide. This pneumatic actuating drive has a piston 51 which is guided in a cylinder space 50 of the housing, the piston rod 52 of the piston 51 being connected with the slide 49 via a threaded bolt 53 with sliding block 54 in such a way that it can carry out a vertical movement relative to the piston rod during the reciprocating movement thereof. A pressure spring 55 holds to the piston 51 in it's right-hand end position. A closing cover 56 of the cylinder space 50, which is provided with a pneumatic connection 57, serves as a stop for the piston.

A tension spring 58, biases the supporting element 48 against the base 47, is suspended between the supporting element 48 and the base 47. Lifting segments 59, 59a and 60, 60a are formed on the slide 49 and comprise correspondingly shaped surfaces which contact supporting surfaces of the supporting element and base and transmit the operating pressure to the base 47. The slide 49 is provided with a cut-out portion 61 for the tension spring 58.

The device described above operates in the following manner:

Before the workpiece carrier 1 enters the lifting and positioning device, the first separator 8, the main separator 9, and the supporting element 48 are lowered, and the rail 33 is drawn back by means of the spring 42. An advancing workpiece carrier 1 first actuates the switch 18, whose signal actuates the corresponding pneumatic valves in such a way that the cylinder spaces 17 of the pistons 14 are emptied of air and the springs 15 press the pistons upward. The advancing workpiece carrier 1 is accordingly stopped by the damping ring 16 of the main separator, while the subsequent workpiece carrier is stopped by the damping ring 16 of the first separator 8.

Shortly before reaching its stop position, the advancing workpiece carrier 1 activates the switch 19, whose signal triggers the pneumatic system for the piston 41. The compressed air flowing into the cylinder space 40 presses the piston to the left into the position according to FIG. 3. This movement is transmitted via the piston rod 39 to the rail 33 and the spring-loaded pin 45. The latter penetrates into the prismatic recess 31 of the workpiece carrier 1 with its wedge-shaped end 45a and fixes it. A position correction of the carrier in the transporting direction is associated with this fixing. Subsequently, the rail 33 presses the workpiece carrier against the fixed rail 32 in which position accompanied by the cooperation of the wedge surfaces 34, 35 of the rails and the prism grooves 30 of the holder 1, the latter is lifted from the roller-conveying chains 5, 6 (FIG. 3).

As can be seen from FIG. 1, the device has another magnetic-field switch 62 which is actuated by the continuation of the movable rail 33, specifically when the workpiece carrier 1 is fixed and lifted. The signal of the switch 62 causes the pneumatic system to act upon the piston 51 with compressed air, so that it moves from its initial position, which is predetermined by means of the closing cover 56, into the position according to FIG. 3 against the action of the pressure spring 55. The slide 49 connected with the piston rod 52 participates in this movement, wherein its lifting segments 59, 59a and 60, 60a, which are supported at the surfaces of the base 47 and the supporting element 48, transfer the supporting element 48 into its working position, according to FIG. 3, against the action of the spring.

As soon as the supporting element 48 has reached its working position, according to FIG. 3, a magnetic-field switch 63 transmits a signal which sets the processing or outfitting process in operation. After the processing is completed, the cylinder space 50 is emptied of air at a machine signal by means of the valve arrangement provided for this purpose. The spring 55 is accordingly in the position of returning the piston 51 to its right-hand end position. The slide 49, which is carried along by means of the piston rod 52 allows a lowering of the supporting element according to position of the lifting segments 59, 59a and 60, 60a. The lowering is supported by means of the tension springs 58.

Switching of the valve, which removes the air from the cylinder space 40 of the piston 41, results from the backward movement of the piston 51. Accordingly, the spring 42 is able to return the piston into its right-hand end position, which is predetermined by means of the closing cover 40a. The movable rail 33, which is operatively connected with the piston rod 39, and its pin 45 release the carrier 1, so that the latter falls back again on the roller-conveying chains 5, 6. A signal is sent from the switch 62 and opens the main separator 9 by means of lowering the piston 14 and the piston rod 13. The workpiece carrier 1 with the workpiece just processed or outfitted, respectively, can now move out of the device whereby whereupon it actuates the switch 20. The first separator 8 is accordingly also opened. The following workpiece carrier can run in. It is stopped by the main separator 9 which is closed by means of the switch 18.

Since the piston stroke in the separators is caused by means of the spring force, these separators are closed automatically during cutting off of the pneumatic system. A continued transporting of the workpiece carriers is accordingly prevented.

On the other hand, the means provided for lifting, fixing and supporting the workpiece carrier are transferred into their working position by means of compressed air. During cutting off of the pneumatic system, the diverse pistons are held in their initial position by means of the springs assigned to them, so that no processing of the workpiece located on the workpiece carrier is possible.

Instead of the use of wedge-shaped beveled portions as stop surfaces and locking bar surfaces, these surfaces could also have a conical shape. It is substantial that the surfaces have identical angles of inclination, so that there is the greatest possible contact between the stop surfaces and the locking bar surfaces.

In the embodiment shown, stop surfaces are formed at all four sides of the workpiece carrier 1. In the event of square workpiece carriers, this has the advantage that the latter can be deposited on the conveying path in two rotational positions.

We claim:

1. A device for lifting and positioning platelike workpiece carriers having stop surfaces formed on opposite lateral sides thereof and movable along a conveying path, and device comprising:

stop means for stopping a workpiece carrier and movable into the conveying path of the workpiece carrier;

two rails located on opposite sides of the conveying path of the workpiece carrier, each rail having a locking bar surface cooperating with a respective stop surface of the workpiece carrier in a stop position of the workpiece carrier to lift the workpiece carrier and fix it in a predetermined position thereof, at least one of said rails being movable transverse relative to the conveying path of the workpiece carrier; and means for supporting the workpiece carrier, which is lifted from the conveying path and fixed in a predetermined position against an operating pressure, said supporting means comprising a base, a supporting element for supporting a workpiece carrier and movable vertically relative to the conveying path, a slide located between said base and said supporting element and having lifting surfaces, and a motor-powered actuating drive for moving said slide between a first position in which said slide is spaced from said supporting element, to a second position in which said lifting surfaces of said slide engage the supporting element so that said supporting element, said slide, and said base are located one above the other to lift said supporting element.

2. A device according to claim 1 wherein said motor-powered actuating means comprises an air cylinder, a piston displaceable in said air cylinder, and a piston rod connected with said piston and said slide for moving said slide upon displacement of said piston in said air cylinder.

3. A device according to claim 2 wherein said motor-powered actuating means comprises a spring acting on said piston to move said slide from the second position thereof to the first position thereof upon venting air from said air cylinder.

4. A device according to claim 1 wherein said device comprises two spaced transporting bands for transporting the workpiece carriers along the conveying path, said supporting element being displaceable between said spaced transporting bands, said device further comprising a return spring for biased said supporting element to said base.

* * * * *